W. GADKE.
BALL KEY.
APPLICATION FILED JAN. 22, 1916.

1,244,848.

Patented Oct. 30, 1917.

Inventor—
William Gadke
by his Attorneys
Howson & Howson

UNITED STATES PATENT OFFICE.

WILLIAM GADKE, OF PHILADELPHIA, PENNSYLVANIA.

BALL-KEY.

1,244,848.  Specification of Letters Patent.  Patented Oct. 30, 1917.

Application filed January 22, 1916. Serial No. 73,683.

*To all whom it may concern:*

Be it known that I, WILLIAM GADKE, a citizen of the United States, residing in Philadelphia, Pennsylvania, have invented a Ball-Key, of which the following is a specification.

One object of my invention is to provide a relatively simple, inexpensive and reliable form of key or locking device whereby two members may be held together so as to be prevented from relative movement, the construction and arrangement of parts being such as to permit of the easy and rapid adjustment of one of the members necessary for operating the device.

Figure 1:
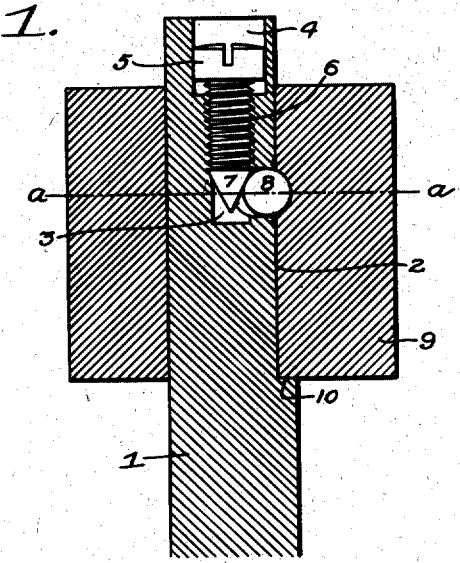
Figure 2:
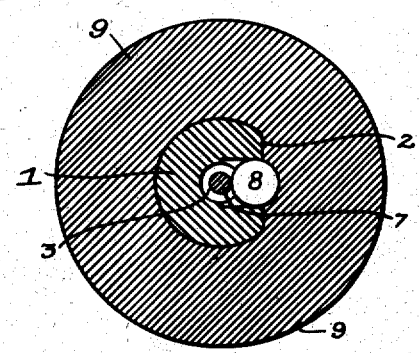

These objects and other advantageous ends I secure as hereinafter set forth, reference being had to the accompanying drawings, in which, Figure 1 is a vertical section illustrating the preferred form of my invention; and Fig. 2 is a section on the line *a—a*, Fig. 1.

In the above drawings 1 represents a structure shown in this case as a portion of a shaft or spindle whose outer end is cut away to provide a plane face 2 parallel with its axis. Extending inwardly from one end of the spindle is a threaded cavity 3 having an enlarged outer portion 4 for the reception of the head 5 of a screw 6 operative in its main portion. The inner end of this screw has an inclined portion in the shape of a conical point 7 and is designed to coöperate with a hardened metal ball 8 mounted in a passage extending laterally from the inner end of the hole 3 so as to open preferably at about the middle portion of the plane face 2 of the spindle. In order to retain the ball 8 in this lateral passage while permitting a portion of its convex surface to project beyond the plane face of the spindle, the latter is upset so as to overhang or contract the outer end of the passage after the ball has been inserted.

The member 9, which it is desired to mount on and lock to the spindle 1, is provided with an opening into which the part of said spindle which has the plane face 2 closely fits, so that after the two parts have been put together there is no possibility of their relative rotation. In the case illustrated, the spindle 1 is provided with a shoulder 10 formed between its plane face 2 and its adjacent cylindrical surface, against which the member 9 abuts and the latter is provided with a spherically curved recess at a point on the plane surface of its passage adjacent the outlet of the lateral opening which contains the ball 8 of the spindle 1.

In order that the member 9 may be placed on the end of the spindle, the screw 6 is backed out of its recess to such an extent that the ball 8 may be made to lie wholly within the lateral passage so that it does not project beyond the surface 2. Thereafter when the spindle 1 has been placed in the opening of the member 9 and has been brought into engagement with the shoulder 10, the screw 6 may be set up to cause its conical point 7 to engage the ball 8 which is thus forced radially outward into the recess of said member 9 until it is firmly seated therein. Obviously the spindle 1 and member 9 are thus rigidly locked together, since the ball 8 is held by the screw 6 from moving back into its recess.

While I preferably provide a spherically curved or suitably formed recess in the member 9 for the reception of the ball 8, this may in some cases be omitted and said ball be caused to forcibly indent said member when it is moved outwardly by the screw so as to lock the parts together against longitudinal or other relative movement. When the screw 6 is backed out of its hole 3, the ball 8 is free to move into the lateral passage so as to permit of the free separation of the member 9 from the member 1.

I claim:—

The combination of a spindle having a portion of its cylindrical surface cut away to form a plane face; a member having a passage for the reception of said spindle and formed with a cavity in the wall of said passage, there being a threaded cavity in the spindle having a lateral extension formed with a contracted outlet on said plane face; a ball in said cavity having its movement in the lateral extension thereof limited by said contracted outlet; with a screw threaded in the cavity and having a conical point movable into engagement with the ball to project the same into the cavity of the second member.

WILLIAM GADKE.